United States Patent
Griepentrog et al.

(10) Patent No.: US 6,414,463 B1
(45) Date of Patent: Jul. 2, 2002

(54) METHOD FOR MEASURING THE SPEED OF AN INDUCTION MACHINE

(75) Inventors: Gerd Griepentrog, Gutenstetten; Diethard Runggaldier, Stegaurach, both of (DE)

(73) Assignee: Siemens AG, Munich (DE)

(*) Notice: Subject to any disclaimer, the term of this patent is extended or adjusted under 35 U.S.C. 154(b) by 0 days.

(21) Appl. No.: 09/787,713

(22) PCT Filed: Sep. 10, 1999

(86) PCT No.: PCT/DE99/02876
§ 371 (c)(1), (2), (4) Date: Mar. 21, 2001

(87) PCT Pub. No.: WO00/17999
PCT Pub. Date: Mar. 30, 2000

(30) Foreign Application Priority Data

Sep. 21, 1998 (DE) .......................................... 198 43 133

(51) Int. Cl.[7] .................................................. H02P 5/28
(52) U.S. Cl. ...................... 318/807; 318/810; 318/254; 318/439
(58) Field of Search .................................. 318/138, 254, 318/439, 799, 800, 801, 732, 806–811

(56) References Cited

U.S. PATENT DOCUMENTS

| | | | | |
|---|---|---|---|---|
| 4,746,850 A | * | 5/1988 | Abbondanti | 318/723 |
| 4,766,360 A | * | 8/1988 | Haraguchi et al. | 318/732 |
| 5,548,197 A | | 8/1996 | Unsworth et al. | |
| 5,644,205 A | | 7/1997 | Phouc et al. | |
| 6,034,502 A | * | 3/2000 | Buhler | 318/700 |

FOREIGN PATENT DOCUMENTS

| | | |
|---|---|---|
| DE | A1-2715935 | 9/1978 |
| DE | A1-19503658 | 2/1996 |
| EP | B1 454697 | 11/1991 |
| EP | B1 512372 | 11/1992 |

\* cited by examiner

*Primary Examiner*—Khanh Dang
(74) *Attorney, Agent, or Firm*—Harness, Dickey & Pierce

(57) ABSTRACT

In order to measure the rotation speed of an induction machine whose stator is connected via a controllable AC controller to a single-phase or polyphase AC power supply system, the stator is disconnected from the AC power supply system for at least a predetermined time period ($\Delta t$). This is preferably achieved by opening active devices in the AC controller, with at least one stator voltage, which is induced in the stator by the rotary movement of the rotor, being measured in this time period ($\Delta t$). The measured values are used to determine the frequency of the stator voltage and to derive the rotation speed of the induction machine.

19 Claims, 4 Drawing Sheets

METHOD FOR MEASURING THE SPEED OF AN INDUCTION MACHINE

This application is the national phase under 35 U.S.C. §371 of PCT International Application No. PCT/DE99/02876 which has an International filing date of Sep. 10, 1999, which designated the United States of America.

FIELD OF THE INVENTION

The invention relates to a method for measuring the rotation speed of an induction machine whose stator is connected via a controllable AC controller to a single-phase or polyphase AC power supply system. The invention also relates to a device for determining the rotation speed of an induction machine.

BACKGROUND OF THE INVENTION

It is known for controllable AC controllers to be used for matching the electric volt-amperes supplied to an induction machine to the respectively prevailing load conditions, in particular during starting and braking.

Such a microprocessor-controlled AC controller or soft starter, as is known for example from EP 0 454 697 B1, operates using the phase-gating principle and is used essentially for smooth starting and stopping of three-phase asynchronous machines. Three sets of active devices, in general each including two back-to-back connected thyristors, are generally actuated by a microprocessor for this purpose.

The control device in the known three-phase controller has no information about the present rotation speed of the machine. With certain mechanical load conditions, this can lead to poor operation of the overall drive. When stopping a pump drive, an abrupt drop in rotation speed can occur, which can lead to extremely high pressures in the pipeline system and thus to severe mechanical loads, and even to destruction of the system. A corresponding situation applies to the starting of drives when a sudden rise in the rotation speed occurs.

If the rotation speed is known, the control device, generally a microprocessor, can be used to provide rotation speed control which allows largely smooth starting and stopping of the drive, even when the mechanical load conditions are poor.

DE 27 15 935 A1 discloses a starting monitor for asynchronous machines, in which the phase angle between the current and voltage is determined. This is used to derive binary information about the starting of the machine. If starting does not take place within a specific time period, the machine is disconnected from the power system once again in order to avoid thermal overloads.

In U.S. Pat. No. 5,548,197A, the current zero crossings of the three stator currents are detected using, inter alia, the voltage which can be measured across the thyristors for this purpose. Two immediately successive current zero crossings are used to form an error signal by subtracting the times of the zero crossings from one another and then subtracting one-sixth of the power supply system period. The error signal, which fluctuates about the zero point, is subjected to frequency analysis, and the rotation speed of the rotor is determined from this. Power supply system disturbances can in this case result in corruption of the measurement signal.

A method which measures the polarity of the induced terminal voltage during the process of stopping an induction machine by means of a three-phase controller and which determines the rotation speed from the time difference between the polarity changes of the individual voltages is described in EP 0 512 372 B1. In any case, during the stopping process, there are time periods in which the induction machine is disconnected from the power supply system and in which, in consequence, no currents flow in the stator either. There is thus no need to interrupt the current supply solely to measure the rotation speed. In this case, in order to brake the induction machine, specific trigger sequences of thyristors are defined in advance, and the time offset of the respective polarity change is evaluated as the frequency for determining the rotation speed. On the other hand, no method is specified for general starting and stopping.

U.S. Pat. No. 5,644,205A and DE 195 03 658 C3 each indicate a method for measuring the rotor angular velocity for machines using frequency-changing control. These methods use the frequency of the induced voltage once the power supply has been disconnected from the machine to determine the rotor angular velocity. Owing to the considerably different functional principles of frequency changers and three-phase controllers, the method of producing a stator without current, which is known from the cited documents, cannot be transferred to machines controlled by three-phase controllers.

SUMMARY OF THE INVENTION

Against the background of the prior art, the invention is now based on the object of specifying a method for measuring the rotation speed of an induction machine, which can be carried out easily during acceleration during the starting of the induction machine and in which there is no need for any additional measured value sensors for detecting the rotation speed. Furthermore, the invention is based on the object of specifying a device for controlling such an induction machine.

According to the invention, the first-mentioned object is achieved by a method for measuring rotation speed of an induction machine whose stator is connected, via a controllable AC controller having active device arrangements, to an AC power supply. The method includes controlling the active device arrangements to disconnect the stator from the AC power supply system for at least one predetermined time period ($\Delta t$), which is less than half of a period (T) of a voltage of the AC power supply system, by controlling the active device arrangements; measuring in the time period ($\Delta t$), a voltage which is induced in the stator by rotary movement of a rotor and using the measured voltage to determine components of a stator voltage space vector; and determining a rotation frequency of the stator voltage space vector from the measured voltage, and deriving the rotation speed of the induction machine therefrom. In the method for measuring the rotation speed of an induction machine whose stator is connected via a controllable AC controller to a single-phase or polyphase AC power supply system, the stator is disconnected from the AC power supply system for at least a predetermined time period by controlling the active devices in the AC controller. At least one stator voltage, which is induced in the stator by the rotary movement of the rotor, is measured in this time period. The measured values obtained in this way are used to determine the frequency of this stator voltage, and the rotation speed of the induction machine is derived from this.

The stator is thus temporarily placed in a situation where no current is flowing during acceleration of the induction machine. During the time period in which no stator current is flowing, a slowly decaying direct current flows in the rotor. As a result of this, the rotor can be regarded as a rotating magnet with virtually constant magnetic flux, with respect to the rotor coordinate system. The rotation induces voltages (terminal voltages) across the stator terminals of the induction machine, whose frequency corresponds to the product of the known number of pole pairs p and the mechanical rotation speed to be measured.

According to the invention, the rotation speed of the rotor is detected using the frequency of the stator voltage space vector, which can be determined on the basis of the induced voltage, during a time period which is produced deliberately with the aid of the controllable AC controller and in which no current flows in the stator. According to the invention, the time duration of this time period is shorter than the time duration of half the period of the power supply system voltage, in order to influence the operation of the drive only to a minor extent.

For the same reasons, in a further preferred refinement of the invention, the rotation speed measurement in accordance with the abovementioned method is repeated after specific time periods, which are preferably 5 to 15 times the period of the power supply system voltage.

Thyristors are preferably used as the active device arrangements, and the induction machine is disconnected from the AC power supply system by omitting the trigger signals required to trigger the thyristors.

In one particularly preferred refinement of the invention, in order to resume the power supply system operation of the induction machine in the case of a three-phase induction machine, the first trigger signal for the first-opened first active device arrangement in one phase is delayed by a multiple of half the power supply system period with respect to the last trigger signal for this first active device arrangement. At the same time as the renewed triggering of this first active device arrangement, a second active device arrangement is triggered, which is an active device arrangement that is triggered subsequently in normal operation. The third active device arrangement is triggered one-sixth of the power supply system period after the triggering of the first active device arrangement, with the trigger signal sequence which was present before the disconnection then being reproduced. This measure ensures that the interruption in the voltage supply to the induction machine which follows the rotation speed measurement has as little influence as possible on the continued operation of the induction machine.

In a further advantageous refinement of the method, during the time period during which no current is flowing in the stator in the case of a polyphase AC power supply system, the terminal voltages which are in each case induced in the stator windings between the stator terminals are measured. The angle of the space vector of the induced stator voltage is in each case calculated, in particular, from the measured values of the terminal voltage.

For discrete-time sampling of the induced terminal voltage, the clock rate is in this case defined such that the associated angles of the space vector of the induced stator voltage are calculated for as many times as possible within the time period. The determined angles of the space vector are associated, within the time period during which no current is flowing in the stator, with a straight line from whose gradient the rotation speed of the induction machine is determined.

According to the invention, the second-mentioned object is achieved by a device for determining rotation speed of an induction machine whose stator is connected via an AC controller to an AC power supply system. The device includes a control device for controlling the AC controller, and for disconnecting the stator from the AC power supply system for a predetermined time period ($\Delta t$), which is shorter than half a period (T) of a voltage of the AC power supply system, by controlling active device arrangements of the AC controller; a voltage measurement device for measuring at least one terminal voltage which is induced in the stator by rotary movement of a rotor in the time period ($\Delta t$); and a computation device for calculating a frequency of the measured terminal voltage and for calculating the rotation speed of the induction machine from the calculated frequency, wherein a control signal for the control device is present at one output of the computation device, the control signal being derived from the rotation speed and being passed to the control device. The device for controlling an induction machine, whose stator is connected via an AC controller to a single-phase or polyphase AC power supply system, contains a control device for controlling the AC controller and for disconnecting the stator from the AC power supply system for a predetermined time period by opening the active device arrangements in the AC controller. It further includes a voltage measurement device for measuring at least one stator voltage which is induced in the stator by the rotary movement of the rotor in this time period. Finally, a computation device is included, for calculating the frequency of this stator voltage from the measured values obtained in this way, and for calculating the rotation speed of the induction machine from this frequency.

In one preferred embodiment, the rotation speed is used to derive a control signal for the control device. This control signal is produced at one output of the computation device and is passed via a control line to the control device.

Further preferred embodiments of the device are evident from the subsequent description of the present invention.

BRIEF DESCRIPTION OF THE DRAWINGS

In order to explain the invention further, reference is made to the exemplary embodiment in the drawing, in which.

DETAILED DESCRIPTION OF PREFERRED EMBODIMENTS

Figure 1:
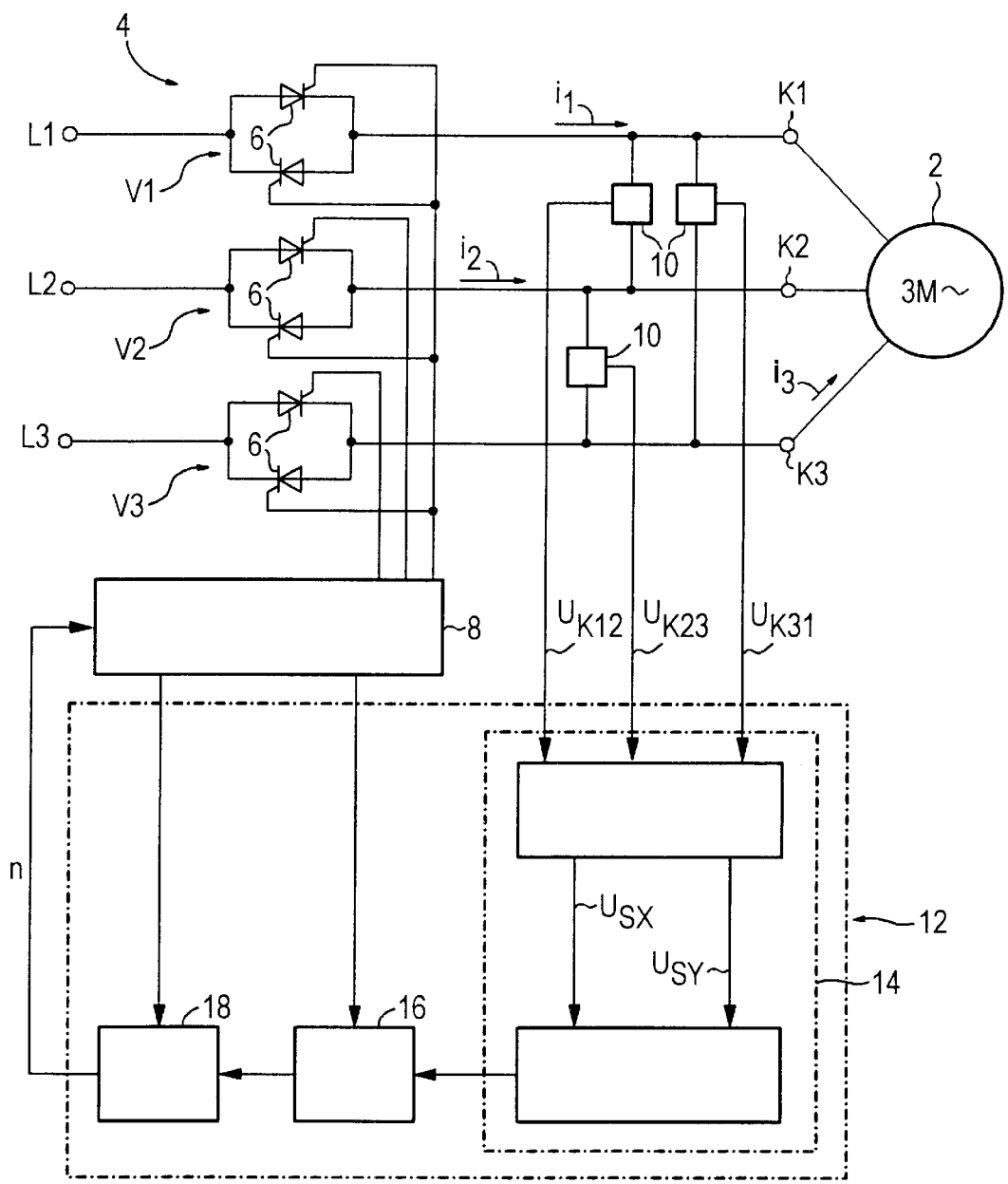
FIG. 1 shows a device according to the invention for controlling a three-phase induction machine, illustrated in the form of a schematic block diagram.

According to FIG. 1, an induction machine 2, in the example of a three-phase asynchronous machine, is connected via a three-phase AC controller 4 (three-phase controller) to the phases L1, L2, L3 of a three-phase power supply system. Each phase L1, L2, L3 has an associated active device arrangement V1, V2, V3 which, in the exemplary embodiment as shown in FIG. 1, each include two back-to-back parallel connected thyristors 6. The triggering electrodes of the thyristors 6 are connected to a control device 8, which produces the trigger signals required to trigger the thyristors 6, in a predetermined time sequence.

A voltage measurement device 10 is connected between each of the stator terminals K1, K2, K3 of the induction machine 2, at whose output the terminal voltages $u_{K12}$, $u_{K23}$, $u_{K31}$ which occur in each case between the relevant two stator terminals K1, K2, K3 are produced. As an alternative to this, the voltages between a stator terminal K1, K2, K3 and a neutral conductor, which is not shown in the figure, can also in each case be measured and used to derive the terminal voltages $u_{K12}$, $u_{K23}$, $u_{K31}$.

The outputs of the voltage measurement devices 10 are connected to a computation device 12 in which the analog voltage signals $u_{K12}$, $u_{K23}$, $u_{K31}$, which are, for example, present continuously at the input, are processed further. The computation device 12 contains a first computation unit 14 in which the terminal voltages $u_{K12}$, $u_{K23}$, $u_{K31}$, which are present in the form of analog measured value signals, are subjected to a coordinate transformation in the process of which the components $u_{sx}$ and $u_{sy}$ of the space vector $u_s^<$ of the induced stator voltage and, from this, the angle $\gamma$ of the space vector $u_s^<$ of this stator voltage, are calculated. The values obtained in this way for the angle $\gamma$ of the space vector $u_s^<$ are written continuously to a memory 16.

The memory 16 is followed by a second computation unit 18, in which the angles $\gamma$ stored in the memory 16 are read and are used to calculate the rotation speed n of the induction machine 2. The values for the angle $\gamma$ written to the memory 16 are in this case processed further in the second computation unit 18 only in a time period in which it is certain that there is no current flowing in the stator of the induction machine 2. The read process and computation process in the second computation unit 18 are in this case initialized by the control device 8, in which the program routine for the measurement sequence is stored. A control signal which corresponds to the rotation speed n is produced at the output of the computation device 12 and is passed to one input of the control device 8, where it is evaluated in order to control the induction machine 2.

The second computation unit 18 is thus initialized only in a time period in which it is certain that no stator currents $i_1$, $i_2$, $i_3$ are flowing in the phases L1, L2, L3.

Figure 2:
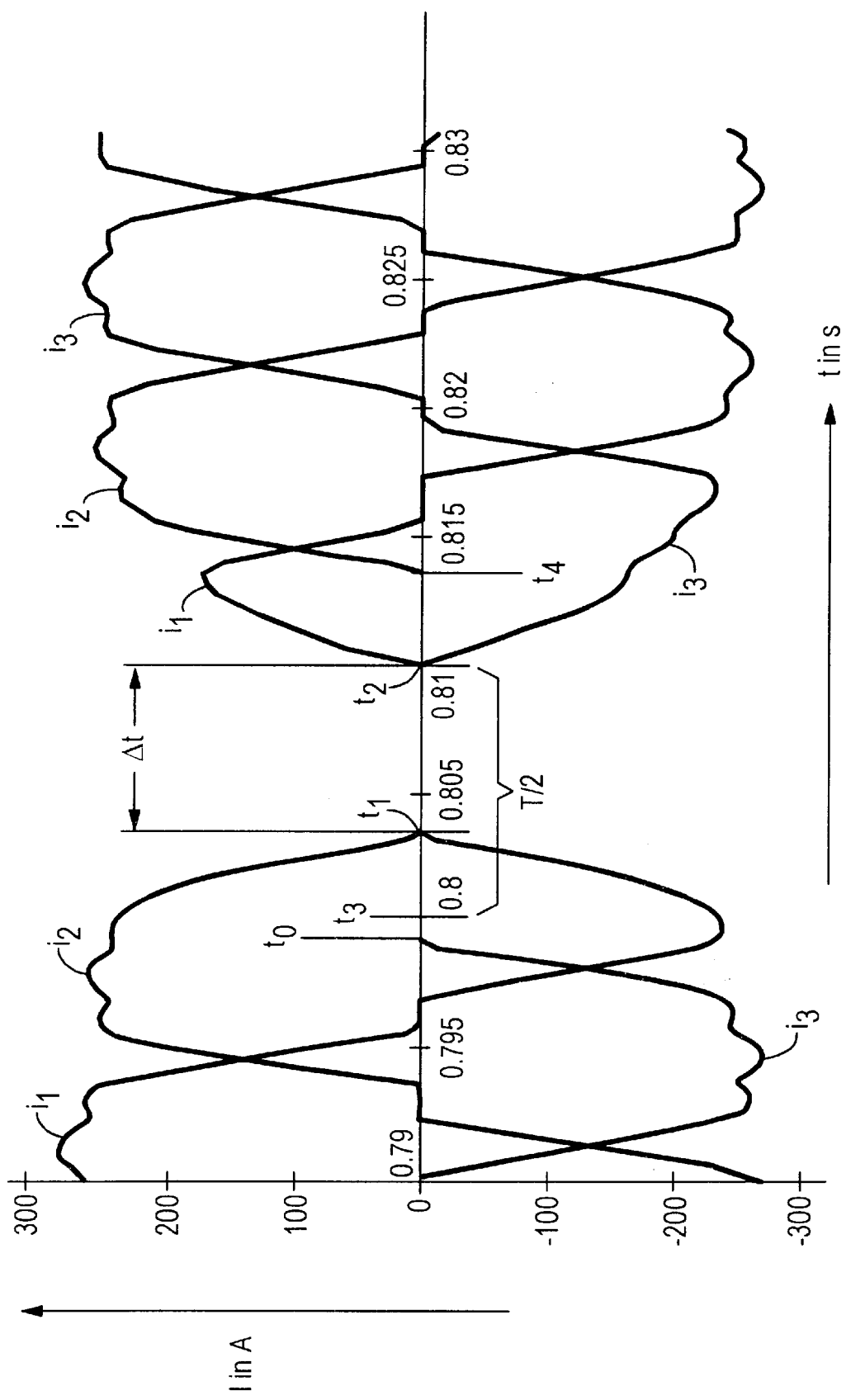
FIG. 2 shows the currents flowing in the stator windings, plotted in the form of a graph with respect to time.

In the graph in FIG. 2, it can be seen that no current is flowing in the stator of the induction machine in a time period $\Delta t$. Thus, all the stator currents $i_1$, $i_2$, $i_3$ are equal to zero in this time period $\Delta t$.

The situation where no current flows in the stator is now produced first of all by not passing any trigger pulses to the thyristors 6 (FIG. 1). This leads to initial extinguishing of the current in one of the three stator windings, in the example the current $i_3$ in the phase L3 at the time to (initial extinguishing phase). The currents $i_1$, $i_2$ in the two remaining windings or phases L1, L2 are then extinguished at the time $t_1$, so that no current is flowing in the stator in the time period $\Delta t$ between $t_1$ and $t_2$, and the evaluation of the terminal voltage $u_{K12}$, $u_{K23}$, $u_{K31}$ can start.

The stator voltage induced at the terminals of the electrical machine, in the stator coordinate system and when no current is flowing in the stator, is given by:

$$u_s^< = L_h \cdot \frac{d}{dt}(i_R^< \cdot e^{j\gamma})$$

-continued $u_s^<$ – space vector of the stator voltage $L_h$ – main inductance of the machine $i_R^<$ – space vector of the rotor current $\gamma$ – rotation angle of the rotor current space vector with respect to the stator coordinate system The following expression is obtained by differentiation:

$$u_s^< = L_h \cdot \left(e^{j\gamma} \cdot \frac{di_R^<}{dt} + j \cdot \omega \cdot e^{j\gamma} \cdot i_R^<\right)$$

$\omega$ – Electrical angular velocity of the rotor, where $\omega = \frac{d\gamma}{dt}$ Since the rate of change of the decaying rotor direct current is negligibly small in comparison to the change resulting from the rotation, the first summand in the bracket in the above equation can be ignored, resulting in:

$$u_s^< = j \cdot L_h \cdot \omega \cdot e^{j\gamma} \cdot i_R^<$$

Figure 3:
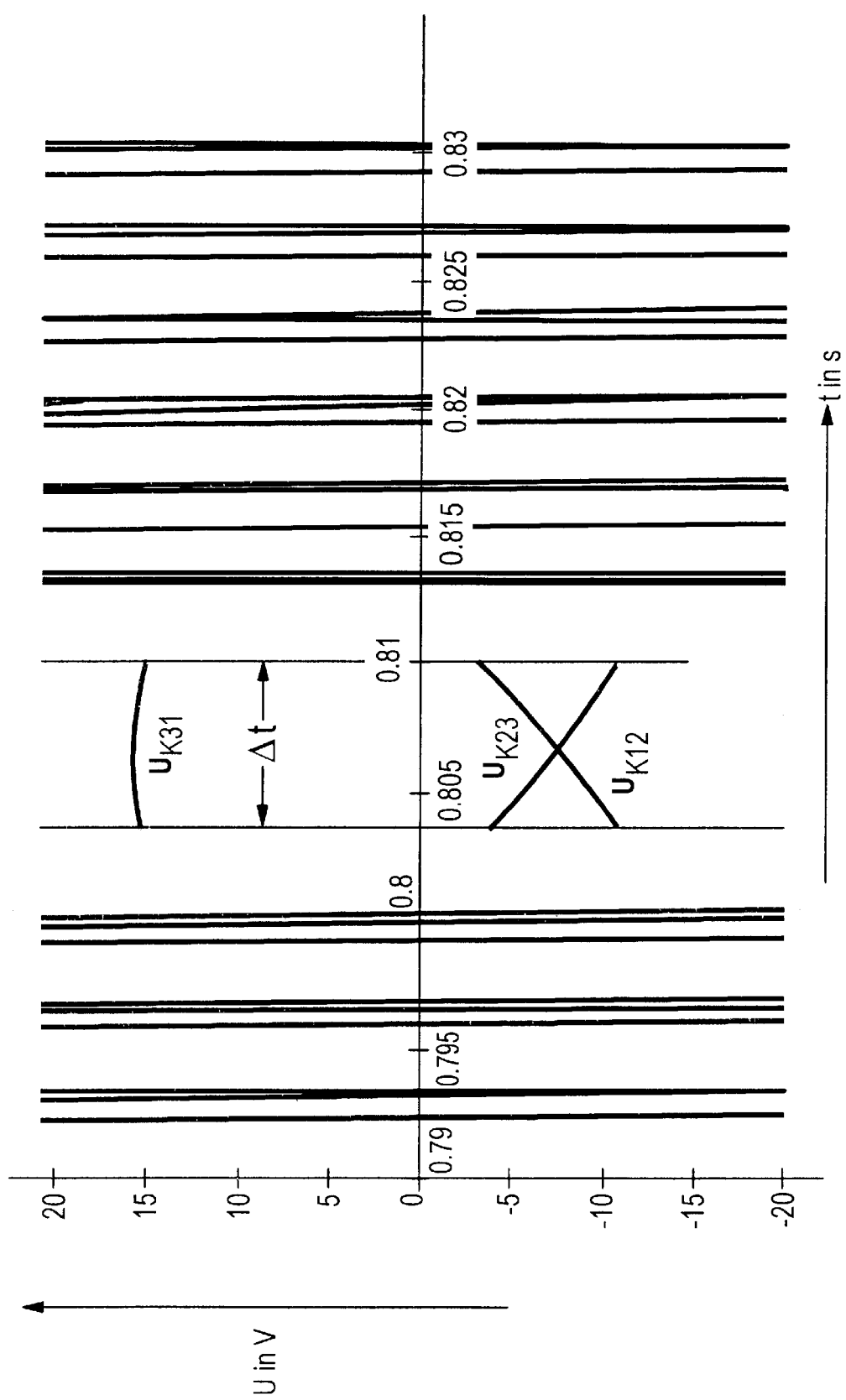
FIG. 3 shows the terminal voltages measured between each of the terminals of the stator, likewise plotted in the form of a graph with respect to time.

It follows from this that the angle between the stator voltage space vector $u_s^<$ and the rotor current space vector $i_R^<$ related to the stator is constant, and that the frequency of the induced terminal voltage $u_{K12}$, $u_{K23}$, $u_{K31}$ corresponds to the electrical angular velocity of the rotor. FIG. 3 shows the waveform of the terminal voltages $u_{K12}$, $u_{K23}$, $u_{K31}$.

The position of the stator voltage space vector $u_s^<$ is now determined from the three measured terminal voltages $u_{K12}$, $u_{K23}$, $u_{K31}$ by means of a coordinate transformation, which is known per se:

$$u_s^< = u_{SX} + j \cdot u_{SY} = \left(\frac{2}{3} \cdot u_{K12} - \frac{1}{3} \cdot u_{K23} - \frac{1}{3}\right) + j \cdot \left(\frac{1}{\sqrt{3}} \cdot u_{K23} - \frac{1}{\sqrt{3}} \cdot u_{K31}\right)$$

$u_{SX}$ – x-component of the stator voltage space vector $u_s^<$ $u_{SY}$ – y-component of the stator voltage space vector $u_s^<$ $u_{K12}, u_{K23}, u_{K31}$ – voltages which can be measured between the stator terminals K1, K2 and K3

The physical orientation (angle) $\gamma$ of the stator voltage space vector $u_s^<$ is obtained from the known relationship:

$$\gamma = arg(u_s^<) = \arctan\left(\frac{u_{SY}}{U_{SX}}\right)$$

Figure 4:
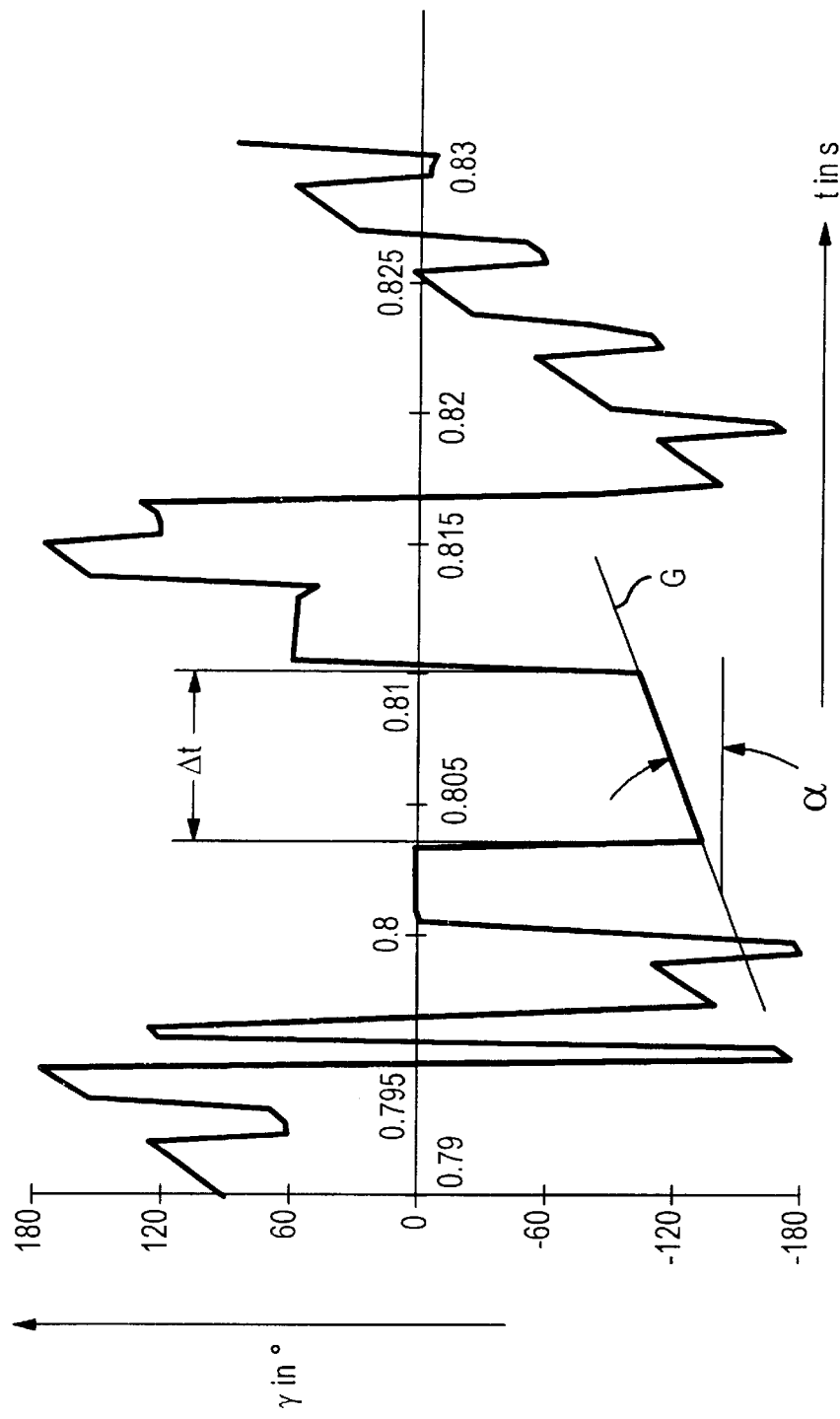
FIG. 4 shows the time profile of the angle of the space vector of the induced voltage, likewise in the form of a graph.

A number of measured values of the physical position of the stator voltage space vector $u_s^2$ are obtained by determining the terminal voltages $u_{K12}$, $u_{K23}$, $u_{K31}$ and calculating the angle $\gamma$ within the time period $\Delta t$ within which no current is flowing in the stator, a number of times. These measured values are shown plotted with respect to time in the graph in FIG. 4. Ideally, at a constant speed, these values produce a straight line G, whose gradient $\alpha$ corresponds directly to the sought electrical angular velocity $\omega$ of the rotor.

In order to obtain a reliable measured value for the electrical rotor angular velocity and to minimize the influence of measurement errors, the gradient is determined with the aid of a comparison straight line, which can be obtained from the recorded angle values by appropriate mathematical methods, preferably by minimizing the squares of the errors.

The mechanical rotor angular velocity is now obtained from the electrical rotor angular velocity simply by dividing by the known number of pole pairs p in the induction machine.

In order to keep the influence on the drive of the time period during which no current is flowing low, the sets of active devices must be retriggered such that the torque and stator currents respond approximately as if no rotation speed measurement had been carried out.

According to FIG. 2, this can be done by increasing the triggering time $t_3$ of the last triggering (but which was not carried out) of the initially extinguishing active device arrangement V3 by half the power supply system period T (=180°) and placing it at the time $t_2=t_3+T/2$. In order to obtain a stator current flow after this retriggering, the retriggering of the active device arrangement V1 which follows the initially extinguishing active device arrangement V3 in the power supply system rotation direction also being placed at the triggering time $t_2$ which results from this. When the current flow starts in response to the first retriggering, the actual rotation speed measurement is terminated, since the induced terminal voltages are once again governed by the stator current flowing and thus do not include any measurement signal containing the rotor angular velocity.

Thus, depending on the type of electrical machine and the load conditions, approximately one-third of a power supply system period is available for the rotation speed measurement. This is completely sufficient for the described method.

The remaining active device arrangement V2 is triggered with a delay of one-sixth of the power supply system period (=60°) with respect to the initially extinguishing active device set at the time $t_4$, resulting in the recreation of the normal cycle of active device triggering processes.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for measuring rotation speed of an induction machine whose stator is connected, via a controllable AC controller having active device arrangements, to an AC power supply system, comprising:

controlling the active device arrangements to disconnect the stator from the AC power supply system for at least one predetermined time period (Δt), which is less than half of a period (T) of a voltage of the AC power supply system, by controlling the active device arrangements;

measuring in the time period (Δt), a voltage which is induced in the stator by rotary movement of a rotor and using the measured voltage to determine components of a stator voltage space vector; and determining a rotation frequency of the stator voltage space vector from the measured voltage, and deriving the rotation speed of the induction machine therefrom.

2. The method as claimed in claim 1, wherein the rotation speed of the induction machine is measured in a number of successive time periods whose time interval is 5 to 15 times the period (T) of the AC power supply system voltage.

3. The method as claimed in claim 1, wherein thyristors are used as the active device arrangements, and wherein the induction machine is disconnected from the AC power supply system by omitting trigger signals which are required to trigger the thyristors.

4. The method as claimed in claim 3, further comprising:

delaying, in order to resume power supply system operation of the induction machine in the case of a three-phase induction machine, a first trigger signal for a first-opened first active device arrangement in one phase by a multiple of half the period (T) with respect to a last trigger signal for the first active device arrangement;

triggering at the same time as triggering of this first active device arrangement is renewed, a second active device arrangement that is triggered subsequently in normal operation; and triggering the third active device arrangement one-sixth of the power supply system period (T) after the triggering of the first active device arrangement, with the trigger signal sequence which was present before the disconnection then being reproduced.

5. The method as claimed in claim 1, further comprising:

measuring in a polyphase AC power supply system, a terminal voltage which is in each case induced in the stator windings between the stator terminals.

6. The method as claimed in claim 5, further comprising:

calculating an angle of the space vector of the induced stator voltage, in each case, from the measured values of the terminal voltage.

7. The method as claimed in claim 6, wherein associated angles of the stator voltage space vector are calculated a plurality of times, and wherein a straight line, from whose gradient the rotation speed of the induction machine is determined, is calculated for the associated angles which occur within the time period (Δt) and which are each associated with specific times.

8. The method of claim 1, wherein the AC power supply system is single phase.

9. The method of claim 1, wherein the AC power supply system is polyphase.

10. A device for determining rotation speed of an induction machine whose stator is connected via an AC controller to an AC power supply system, comprising:

a control device for controlling the AC controller, and for disconnecting the stator from the AC power supply system for a predetermined time period (Δt), which is shorter than half a period (T) of a voltage of the AC power supply system, by controlling active device arrangements of the AC controller;

a voltage measurement device for measuring at least one terminal voltage which is induced in the stator by rotary movement of a rotor in the time period (Δt); and a computation device for calculating a frequency of the measured terminal voltage and for calculating the rotation speed of the induction machine from the calculated frequency, wherein a control signal for the control device is present at one output of the computation device, the control signal being derived from the rotation speed and being passed to the control device.

11. The device as claimed in claim 10, wherein the active device arrangements include thyristors.

12. The device as claimed in claim 10, wherein the AC power supply system is a polyphase AC power supply system, and a voltage measurement device is arranged between each of the stator terminals.

13. The device as claimed in claim 10, wherein the computation device includes a first computation unit for calculating an angle of a space vector of an induced stator voltage from respective measured values, and a memory for storing the calculated angles.

14. The device as claimed in claim 13, wherein the computation device includes a second computation unit for calculating a gradient of a straight line, which is formed by angle and time value pairs stored in the memory, and for determining the frequency of the space vector of the induced stator voltage and the rotation speed of the induction machine.

15. The apparatus of claim 10, wherein the AC power supply system is single phase.

16. The apparatus of claim 10, wherein the AC power supply system is polyphase.

17. The device as claimed in claim 11, wherein the AC power supply system is a polyphase AC power supply system, and a voltage measurement device is arranged between each of the stator terminals.

18. The device as claimed in claim 17, wherein the computation device includes a first computation unit for calculating an angle of a space vector of an induced stator voltage from respective measured values, and a memory for storing the calculated angles.

19. The device as claimed in claim 18, wherein the computation device includes a second computation unit for calculating a gradient of a straight line, which is formed by angle and time value pairs stored in the memory, and for determining the frequency of the space vector of the induced stator voltage and the rotation speed of the induction machine.

* * * * *